United States Patent
B et al.

(10) Patent No.: US 9,213,503 B2
(45) Date of Patent: Dec. 15, 2015

(54) SERVICE PROVIDER MANAGEMENT OF VIRTUAL INSTANCES CORRESPONDING TO HARDWARE RESOURCES MANAGED BY OTHER SERVICE PROVIDERS

(75) Inventors: Kamath Harish B, Bengalooru Karanataka (IN); Bhatia Rajesh, Bangalore Karnataka (IN)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 216 days.

(21) Appl. No.: 13/284,944

(22) Filed: Oct. 30, 2011

(65) Prior Publication Data

US 2013/0111469 A1    May 2, 2013

(51) Int. Cl.
 G06F 9/46 (2006.01)
 G06F 3/12 (2006.01)
 G06F 9/50 (2006.01)

(52) U.S. Cl.
 CPC .............. *G06F 3/1211* (2013.01); *G06F 3/124* (2013.01); *G06F 3/1287* (2013.01); *G06F 9/505* (2013.01); *G06F 9/5044* (2013.01); *G06F 2206/1508* (2013.01)

(58) Field of Classification Search
 USPC ......................................................... 718/105
 See application file for complete search history.

(56) References Cited

U.S. PATENT DOCUMENTS

| 7,596,618 | B2* | 9/2009 | Basu et al. ..................... 709/226 |
| 7,804,611 | B2  | 9/2010 | Castellani |
| 8,271,653 | B2* | 9/2012 | Dehaan ......................... 709/226 |
| 8,351,691 | B2  | 1/2013 | Chen et al. |
| 2002/0097428 | A1 | 7/2002 | Ferlitsch |
| 2006/0070078 | A1* | 3/2006 | Dweck et al. .................. 718/104 |
| 2006/0080285 | A1* | 4/2006 | Chowdhuri ........................ 707/3 |
| 2006/0279763 | A1 | 12/2006 | Tamura et al. |
| 2008/0030764 | A1* | 2/2008 | Zhu et al. ..................... 358/1.15 |
| 2008/0180713 | A1 | 7/2008 | Kodera |
| 2008/0212110 | A1 | 9/2008 | Truong |

(Continued)

FOREIGN PATENT DOCUMENTS

CN            101938416 A        1/2011

OTHER PUBLICATIONS

Chastain, S., How to Print a Selected Portion of a PDF File, (Webpage), Nov. 11, 2011, http://graphicssoft.about.com/od/adobe/ht/printportiongdf.htm.

*Primary Examiner* — Diem Cao
(74) *Attorney, Agent, or Firm* — Mannava & Kang (57) ABSTRACT

A dynamic pool of virtual instances is managed. Each virtual instance corresponds to one or more hardware resources. Management includes tracking for each virtual instance: historical and current utilization, an operating cost, a capacity, and a characteristic associated with a capability of the hardware resources to which the virtual instance corresponds. A given virtual instance of the dynamic pool of virtual instances on which to schedule a workload for completion is selected, based on a characteristic of the workload matching the characteristic of the given virtual instance, and taking into account the capacity, the current utilization, and the operating cost of the given virtual instance. The hardware resources are managed by service providers different than a service provider managing computing devices on which the virtual instances are managed and the workload is scheduled, and the workload is received from a customer different than any of these service providers.

20 Claims, 5 Drawing Sheets

(56) References Cited

U.S. PATENT DOCUMENTS

| | | |
|---|---|---|
| 2009/0070773 A1* | 3/2009 | Depoutovitch et al. ....... 718/106 |
| 2009/0147308 A1 | 6/2009 | Hasegawa |
| 2009/0195811 A1 | 8/2009 | Lee |
| 2009/0276519 A1* | 11/2009 | Alimi et al. .................. 709/224 |
| 2009/0300608 A1* | 12/2009 | Ferris et al. ....................... 718/1 |
| 2009/0320040 A1* | 12/2009 | Robison ........................ 718/105 |
| 2010/0053670 A1 | 3/2010 | Jeong et al. |
| 2010/0061250 A1* | 3/2010 | Nugent ........................... 370/242 |
| 2010/0131592 A1 | 5/2010 | Zhang et al. |
| 2010/0215191 A1* | 8/2010 | Yoshizawa et al. .......... 381/94.2 |
| 2010/0223378 A1 | 9/2010 | Wei |
| 2010/0306767 A1* | 12/2010 | Dehaan ............................. 718/1 |
| 2010/0318649 A1 | 12/2010 | Moore et al. |
| 2010/0325191 A1 | 12/2010 | Jung et al. |
| 2011/0016214 A1 | 1/2011 | Jackson |
| 2011/0179162 A1* | 7/2011 | Mayo et al. ................... 709/224 |
| 2011/0191092 A1* | 8/2011 | Mizrachi et al. ................ 703/14 |
| 2011/0320606 A1* | 12/2011 | Madduri et al. ............... 709/226 |
| 2011/0321058 A1* | 12/2011 | Schmidt ........................ 718/105 |
| 2013/0111032 A1* | 5/2013 | Alapati et al. ................. 709/226 |

\* cited by examiner

SERVICE PROVIDER MANAGEMENT OF VIRTUAL INSTANCES CORRESPONDING TO HARDWARE RESOURCES MANAGED BY OTHER SERVICE PROVIDERS

BACKGROUND

Historically, hardware resources like computing devices and printing devices have been managed if not owned directly by the users who used them or the organizations with which the users are affiliated, such as their employers. More recently, infrastructure as a service (IaaS), software as a service (SaaS), printing or platform as a service (PaaS), and similar types of solutions have become more widespread. IaaS, SaaS, and PaaS service providers offer services in a scalable manner, which are employed, or consumed, by users in accordance with a business model. These service providers scale their hardware resources internally, taking into account the demands of their services that the providers observe.

DETAILED DESCRIPTION

As noted in the background section, infrastructure as a service (IaaS), software as a service (SaaS) and platform as a service (PaaS)-type solutions have become a more popular way by which users use effectively receive computing and printing services, such as over the Internet, which are delivered by service providers. While this frees the users from having to manage the computing devices or the printing devices responsible for providing these services, it can lock the users into receiving such services from a particular service provider. Different service providers, however, may offer different advantages, different cost structures, and different billing models that the users may want to avail themselves of at different times.

Furthermore, from the service provider standpoint, service providers have to adhere to service level agreements (SLAs) with which they have contracted with users, to provide various types of services with different turnaround times and at different cost structures. If a service provider does not manage its resources well, the provider can find itself in a position where it is unable to meet the guarantees delineated within the SLAs, or has to quickly locate additional resources to ensure that the SLAs are not violated. As such, existing service provider arrangements can be disadvantageous to both customers and the service providers themselves.

Techniques disclosed herein alleviate these shortcomings. In particular, there are two types of service providers. The first type of service provider is that with which customers directly interact to submit workloads for scheduling on and completion by virtual resources (which are referred to herein as virtual instances), monitor and manage workloads, and so on. An example of this first type of service provider is a print service provider. The second type of service provider, such as an infrastructure service provider, actually manages the hardware resources underlying and corresponding to the virtual instances. As such, the first service provider is a "meta" service provider that manages virtual instances offered by second service providers for delivering services.

Such a methodology provides for better management of virtual instances and physical resources that are used by users in the context of IaaS, SaaS, PaaS, and other types of solutions. A system can include a pool manager and a scheduler implemented on a computing device managed by the first service provider. The pool manager manages a dynamic pool of virtual instances. Each virtual instance corresponds to one or more hardware resources that provide the service or solution in question. The virtual instances are managed by the first service providers, whereas the hardware resources underlying the virtual instances are managed by the second service providers. For each virtual instance, the pool manager tracks historical and current utilization, operating cost, and a characteristic associated with a capability of the hardware resources to which the virtual instance corresponds. The scheduler selects a given virtual instance on which to schedule a workload for completion, based on a characteristic of the workload matching the characteristic of the given virtual instance, and taking into account the capacity, the current utilization, and the operating cost of the given virtual instance.

Such an architecture provides for certain advantages in managing the resources. The pool of virtual instances is dynamic. The virtual instances may be sourced from one or more second service providers, such as infrastructure service providers, which provide hardware resources of, at, and with different capacities, costs, and other characteristics. The pool manager manages the virtual instances against the demands for the virtual instances, as indicated by the scheduler, by provisioning virtual instances from second service providers and by also releasing the virtual instances back to these second service providers. Provisioning decisions with respect to a virtual resource can be made based on the tracking of the historical and current utilization, the capacity, and the characteristic of each virtual instance already in the dynamic pool.

The scheduler schedules a workload by matching the characteristic of the workload with the characteristic of a virtual instance that is optimally suited to complete the workload, but taking into account the capacity, the current utilization, and the operating cost of the given virtual instance. Taking into operating cost can be particularly advantageous. This is because the dictates of the workload may be such that the virtual instance representing hardware resources that most closely match the characteristic of the workload may represent unnecessary incurred cost, such that a slightly less optimal virtual instance but with a significantly less operating cost may be more appropriate.

Additionally, a given job to be completed, such as a print job, may be divided into hierarchically organized job components that each correspond to a different workload that is separately scheduled on a virtual instance. Such a job may have some job components that have even significantly different characteristics as compared to other job components. As such, the job components may just loosely inherit characteristics from their parent job components within the hierarchy. Having such granularity in scheduling a job over multiple virtual instances means that more optimal completion of the job as a whole is achieved, in a more cost effective manner. For instance, different job components may be performed by different second service providers—that is, by hardware resources managed by different second service providers.

It is noted that first service providers, such as providers of SaaS and PaaS, manage virtual instances, or resources, which correspond to hardware, or physical, resources. By comparison, second service providers, such as providers of IaaS, manage the hardware, or physical, resources to which the virtual instances correspond. The details of the hardware resources do not have to be, but can be, exposed to the first service providers by the second service providers. Furthermore, a given hardware, or physical, resource may have multiple virtual instances instantiated on it. That is, multiple virtual instances can correspond to or encompass the same hardware, or physical, resource.

Figure 1:
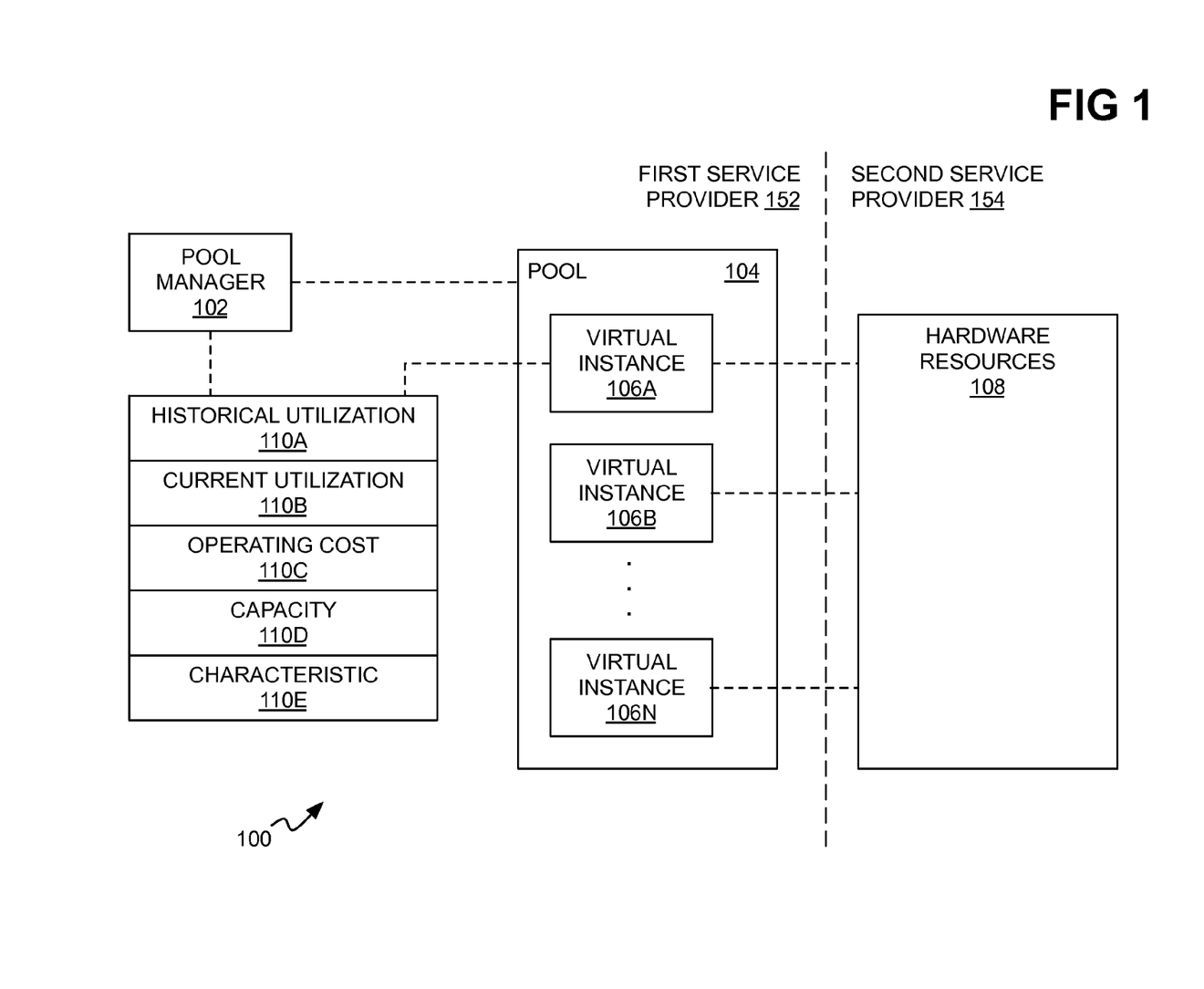
FIG. 1 is a diagram of an example system including a pool manager to manage a dynamic pool of virtual instances corresponding to hardware resources.

FIG. 1 shows an example system 100. The example system 100 includes a pool manager 102, a dynamic pool 104 of virtual instances 106A, 106B, . . . , 106N, collectively referred to as the virtual instances 106, and hardware resources 108. The pool manager 102 can be software that is executed on or by one or more computing devices, like computers. Each virtual instance 106 of the dynamic pool 104 corresponds to one or more of the hardware resources 108. The hardware resources 108 can be computing devices, printing devices, or other types of hardware resources 108.

A first service provider 152 manages and is responsible for the pool manager 102 and the dynamic pool 104 of virtual instances 106. One or more second service providers 154, by comparison, manage and are responsible for the hardware resources 108 themselves to which the virtual instances 106 correspond. The first service provider 152 is different than the second service providers 154. Each virtual instance 106 can correspond to the hardware resources 108 managed by one second service provider 154, although the hardware resources 108 managed by a given second service provider 154 may be represented by more than one virtual instance 106.

The pool manager 102 manages the dynamic pool 104 of virtual instances 106. More specifically, the pool manager 102 can add new virtual instances 106 to the dynamic pool 104, as well as remove existing virtual instances 106 from the dynamic pool 104. The pool manager 102 can cause or request that an existing virtual instance 106 be augmented with additional hardware resources 108 by the second service provider 154 managing the hardware resources 108 associated with this virtual instance 106. Likewise, the pool manager 102 can request or request that an existing virtual instance 106 be diminished by the second service provider 154 managing the hardware resources 108 associated with this virtual instance 106, so that less hardware resources 108 are associated with the virtual instance 106.

The pool manager 102 monitors the virtual instances 106, and specifically tracks information for each virtual instance 106, on which basis the pool manager 102 manages the virtual instances 106. As depicted in FIG. 1, for instance, in representative relation to the virtual instance 106A, the pool manager 102 tracks information 110A, 110B, 110C, 110D, and 110E, collectively referred to as the information 110. The information 110A is historical utilization information; the information 110B is current utilization information; the information 110C is operating cost information; the information 110D is capacity information; and the information 110E is characteristic information.

The historical utilization information 110A includes how the virtual instance 106A has been used in the past. This information can include both periods of use and disuse, as well as how the virtual instance 106A in question was used during the periods of use. For example, the historical utilization information 110A can be related to the type of the virtual instance 106A that was used, such as the average and peak loads for the type of the virtual instance 106A. Other examples of the historical utilization information 110A can include the number, or count, of print (or other types of) jobs assigned to this type of the virtual instance 106A, overall and/or within given time intervals. This information can be used, for instance, to predict usage of the virtual instance 106A at corresponding time intervals in the future.

The current utilization information 110B is similar to the historical utilization information 110A, but describes how the virtual instance 106A is being used, if at all. The operating cost information 110C includes how much it costs to operate the virtual instance 106A. The operating cost may be specified both for when the virtual instance 106A is being used as well as when it is not being used. The operating cost may further be specified in accordance with how the virtual instance 106A is being used. That is, the operating cost may differ depending on the type of workload that the virtual instance 106A is processing.

The capacity information 110D specifies how much of the virtual instance 106A can be used at a given time. For example, the virtual instance 106A may have multiple workloads assigned to it. The capacity information 110D in this case is related to the utilization of the virtual instance 106A on an overall basis, taking into account these multiple workloads. The workloads themselves may be parts of the same print (or other) job, or different jobs. The capacity information 110D can include or be related to a threshold that is employed when determining whether a particular workload is to be scheduled for completion on the virtual instance 106A in question. The characteristic information 110E is somewhat related to the capacity information 110B, and specifies one or more characteristics regarding capabilities of the virtual instance 106A.

Figure 2:
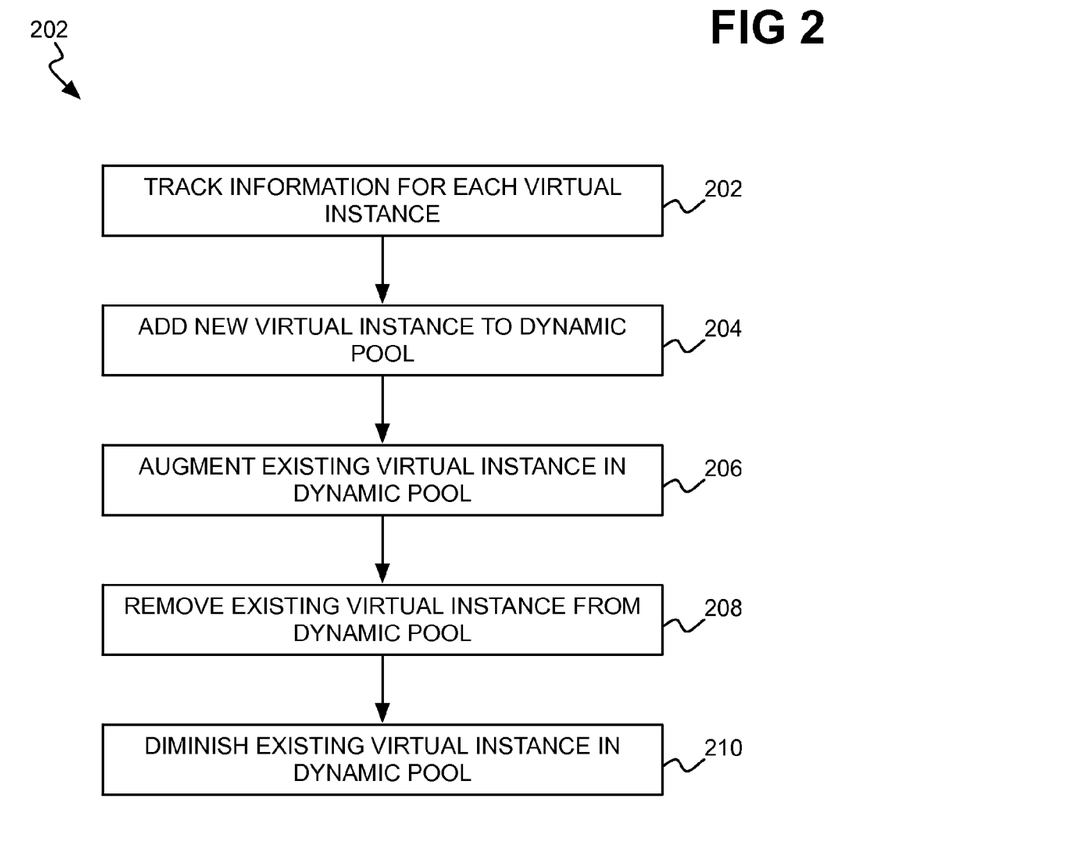
FIG. 2 is a flowchart of an example method for managing a dynamic pool of virtual instances corresponding to hardware resources.

FIG. 2 shows an example method 200 for managing the virtual instances 106 within the dynamic pool 104. The pool manager 102 may perform the method 200. More generally, a processor of a computing device, managed by the first service provider 152, may execute a computer program from a non-transitory computer-readable data storage medium to implement the method 200.

The information 110 is tracked for each virtual instance 106 within the dynamic pool 104 (202), as noted above. Tracking the information 110 may occur in a number of different manners. For example, the pool manager 102 may periodically poll the virtual instances 106 to obtain the information 110. As another example, the pool manager 102 may obtain the information 110 in an event-driven manner, by the virtual instances 106 themselves providing changes in the information 110 to the pool manager 102, without the pool manage having to periodically the virtual instances to obtain the information 110.

A new virtual instance 106 can be added to the dynamic pool 104, based on the tracking of the information 110 (204). The new virtual instance 106 may correspond to hardware resources 108 provided by one of the existing second service providers 154 that manage hardware resources 108 to which an existing virtual instance 106 corresponds, or by a new second service provider 154. Various algorithmic and other approaches may be employed to determine when it is appropriate to add a new virtual instance 106 to the dynamic pool 104. The new virtual instance 106 is added by the first service provider 152, where the new virtual instance 106 itself is acquired from one of the second service providers 154 that provide the hardware resources 108 to which the new virtual instance 106 corresponds.

Similarly, an existing virtual instance 106 within the dynamic pool 104 may be augmented, based on the tracking of the information 110 (208). Augmentation means that additional hardware resources 108 are assigned to the virtual instance 106. The existing virtual instance 106 is augmented by the same second service provider 154 that already provides the hardware resources 108 to which the virtual instance 106 currently corresponds, at the behest of the first service provider 152. Various algorithmic and other approaches may be employed to determine when it is appropriate to augment an existing virtual instance 106 within the dynamic pool 104.

An existing virtual instance 106 within the dynamic pool 104 may likewise be removed, based on the tracking of the information 110 (206). Various algorithmic and other approaches may be employed to determine when it is appropriate to remove an existing virtual instance 106 from the dynamic pool 104. The existing virtual instance 106 is removed by the first service provider 152, and in this respect is relinquished back to the second service provider 154 that provides the hardware resources 108 to which the existing virtual instance 106 corresponds.

The removal process can be a two-step or two-part process. First, once it has been decided to remove an existing virtual instance 106 from the dynamic pool 104, the virtual instance 106 can be immediately tagged for such removal. However, the virtual instance 106 is not immediately removed from the dynamic pool 104. The virtual instance 106 may still be completing previously scheduled workloads, or previously scheduled workloads on the virtual instance 106 may not have yet even been started. Therefore, second, the virtual instance 106 is not removed from the dynamic pool 104 until it has completed such uncompleted workloads already scheduled on the virtual instance 106.

Once the virtual instance 106 has been tagged for removal, new workloads may not be permitted to be scheduled on the virtual instance 106, so that the virtual instance 106 will be able to be removed at some point in the future. However, a virtual instance 106 that has been tagged for removal may be subsequently untagged for removal, such that it is not ultimately removed. For instance, if the incoming workloads greatly increase, a virtual instance 106 that was previously tagged for removal may be untagged, so that these workloads can be scheduled on the virtual instance 106.

An existing virtual instance 106 within the dynamic pool 104 may be diminished, in a counterpart process to the augmentation process of part 206 (210). Diminishing means that some of existing hardware resources assigned to the virtual instance 106 are unassigned from the virtual instance 106. The existing virtual instance 106 is diminished by the same second service provider 154 that provides the hardware resources 108 to which the virtual instance 106 currently corresponds, at the behest of the first service provider 152. Various algorithmic and other approaches may be employed to determine when it is appropriate to diminish an existing virtual instance 106 within the dynamic pool 104.

Figure 3:
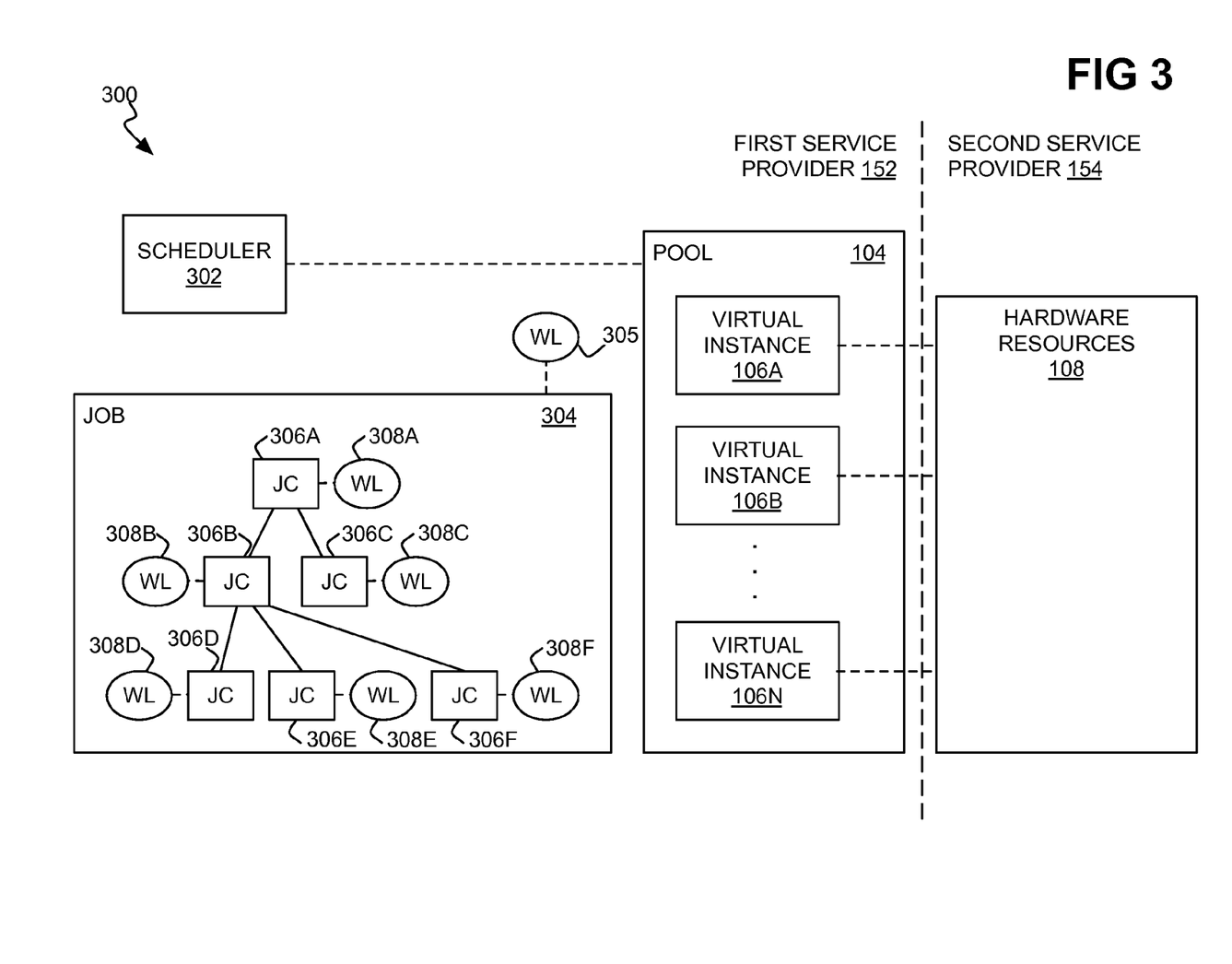
FIG. 3 is a diagram of an example system including a scheduler to schedule a workload on a virtual instance of a dynamic pool for completion.

FIG. 3 shows another example system 300. The example system 300 includes a scheduler 302, the dynamic pool 104 of virtual instances 106, and the hardware resources 108. The scheduler 302 can be software that is executed on or by one or more computing devices, like computers. The first service provider 152 manages and is responsible for the scheduler 302 and the dynamic pool 104 of virtual instances 106. The second service providers 154, as before, manage and are responsible for the hardware resources 108 themselves to which the virtual instances 106 correspond.

The scheduler 302 most generally receives a job 304, and selects a given virtual instance 106 from the dynamic pool 104 on which to schedule a workload 305 corresponding to the job 304 for completion by the virtual instance 106. A job 304 is a request, such as from a client like a client computing device, to have the hardware resources 108 perform, fulfill, or complete the job 304. For example, in the case of a PaaS solution, the job 304 may be a print job that a user is willing to pay to have printed.

As compared to existing service provider architectures, the job 304 is submitted from a customer or client directly to the first service provider 152, and not to the second service provider 154 providing the hardware resources 108 that will ultimately fulfill the job 304. As such, the first service provider 152 can select which second service provider 154 is to fulfill the job 304. Indeed, the job 304 may be fulfilled by multiple second service providers 154, as is described in more detail later in the detailed description.

It is noted that the difference between the job 304 and its associated workload 305 is that the former is what is received from a client (i.e., a customer), and the latter is what the scheduler 302 sends to the given virtual instance 106 to complete the job 306. The scheduler 302 may generate the workload 305 from the job 304. The workload 305 may include the job 304, and may be the job 304 in some implementations. The workload 305 may include a pointer to the job 304, in lieu of including the data of the job 304 itself.

The scheduler 302 selects the given virtual instance 106 from the virtual instances 106 within the dynamic pool 104. The scheduler 302 makes this selection based on a characteristic of the workload 305 (i.e., of the job 304) matching the characteristic of the given virtual instance 106. In making this selection, the scheduler 302 takes into account the historical and current utilization, the capacity, and the operating cost of the given virtual instance 106.

The characteristic of the workload 305 specifies the type of processing that has to be performed to complete the workload 305. As such, the characteristic of the workload 305 is matched to the characteristic of the given virtual instance 106, insofar as the characteristic of the given virtual instance 106 specifies that are sufficient to complete the job 304, as specified by the characteristic of the workload 305. An example in this respect is provided later in the detailed description.

In one implementation, the scheduler 302 does not schedule a workload 305 for the entire job 304, but rather divides the job 304 into multiple job components, and separately schedules individual workloads for the job components. In the example of FIG. 3, the scheduler 302 can divide the job 304 into multiple job components 306A, 306B, 306C, 306D, 306E, and 306F, which are collectively referred to as the job components 306. The scheduler 302 can generate workloads 308A, 308B, 308C, 308D, 308E, and 308F, which are collectively referred to as the workloads 308, and which correspond to the job components 306. The scheduler 302 thus separately selects a given virtual instance 106 for each job component 306 for completion of the job component 306 in question. Thus, different job components 306 can be scheduled for fulfillment by the virtual instances 106 of different second service providers 154.

The job components 306 can be hierarchically organized. For instance, in the example of FIG. 3, the job component 306A is a parent job component to the job components 306B and 306C, and the job component 306B is a parent job component to the job components 306D, 306E, and 306F. Each job component 306 may strictly or loosely inherit its characteristics from its parent job component 306, and also specify other or additional characteristics. Strict inheritance means that a job component 306 inherits each characteristic that its parent job component 306 has. Loose inheritance means that a job component 306 does not have to inherit each characteristic that its parent job component 306 has, but typically inherits at least some such characteristics.

Dividing the job 304 into multiple job components 306 that have corresponding workloads 308 can be advantageous, where particular parts of the job 304 have different characteristics. Consider the following example, which also demonstrates how the workloads 308 are assigned to different virtual instances 106 by matching the characteristics of the former to the characteristics of the latter. The job 304 may include printing a mail message that has two attachments, one in portable document format (PDF), and the other in text format. This job 304 may be divided into six job components 306 correspondingly having six workloads 308.

The first workload 308 is to detect details of the job 304—i.e., that a message having the ascribed two attachments is to be printed—and to generate the other workloads 308. The second workload 308 may correspond to the body of the message, the third workload to the PDF attachment, and the fourth workload to the text attachment. This fourth workload itself may create the fifth and sixth workloads. The fifth workload is to convert the text attachment to PDF, and the sixth workload to convert the resultant PDF-converted text attachment to a printer control language (PCL) format (which is similar to what the third workload does as to the PDF attachment).

Different virtual instances 106 may be scheduled for different of these workloads 308. For instance, the first, second, fourth, and fifth workloads 308 noted in the previous paragraph may be assigned to the same or different virtual instances 106 that are generalized in nature, depending on the capacities of these virtual instance(s) 106, and so on. By comparison, the third and sixth workloads 308 noted in the previous paragraph may be assigned to a specialized virtual instance 106 that is dedicated to converting PDF documents to PCL format, assuming that this virtual instance 106 is available.

Figure 4:
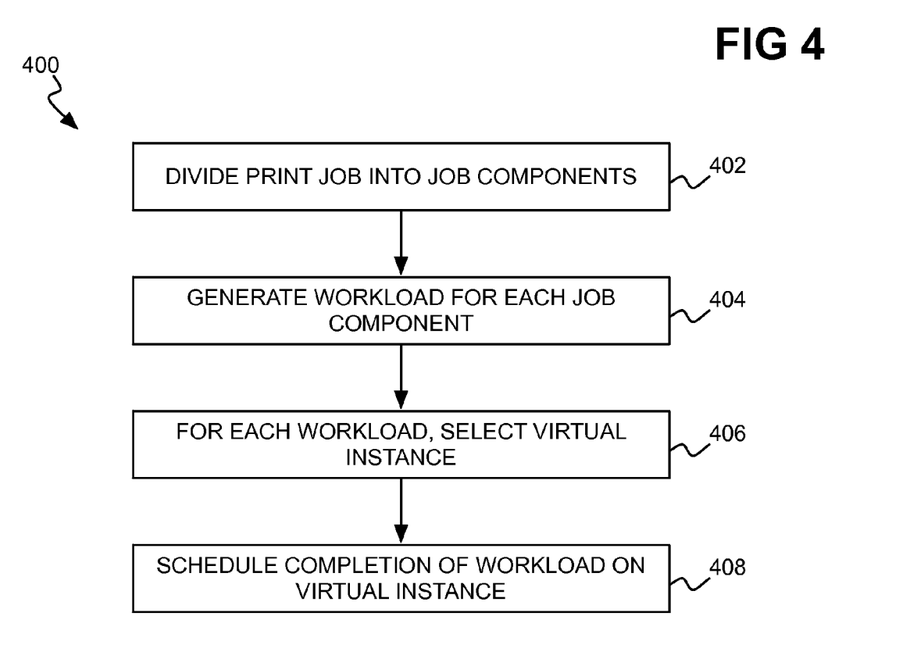
FIG. 4 is a flowchart of an example method for scheduling a workload on a virtual instance of a dynamic pool for completion.

FIG. 4 shows an example method 400 for scheduling a workload 305 corresponding to a job 304 on a virtual instance 106 having hardware resources 108 that are to complete the workload 305 and thus the job 304. The scheduler 302 may perform the method 400. More generally, a processor of a computing device, managed by the first service provider 154, may execute a program from a non-transitory computer-readable data storage medium to implement the method 400.

The job 304 may be divided into hierarchically organized job components 306 (402). Various algorithmic and other approaches may be employed to divide the job 304 into the job components 306. Each section, or job component 306, may further be divided into sub-sections, or additional job components 306, and so on, such as described in the example above.

A workload 308 can be generated for each job component 306, or if the job 304 has not been divided into job components 306, then the workload 305 can be generated for the job 304 as a whole (404). The remaining description of the method 400 presumes workloads 308 being generated for the job components 306, but is equally applicable to a workload 305 being generated for the job 304 as a whole. In its most basic form, generating a workload 308 for a job component 306 can include wrapping the job component 306 in a data wrapper specified by an application programming interface (API) or other type of interface by which the virtual instances 106 expect to receive the workload 308.

For each workload 308, a virtual instance 106 is separately selected (406), even if, as noted above, this means that different workloads 308 are ultimately fulfilled by hardware resources 108 managed by different second service providers 154. The virtual instance 106 is selected based on matching the characteristic of the workload 308 with the characteristics of the virtual instances 106, and taking into account the (historical and/or current) utilizations, the operating costs, and the capacities of the virtual instances 106. Various algorithmic and other approaches may be employed to select a virtual instance separately for each workload 308. At a minimum, however, the given virtual instance 106 should have characteristics corresponding to capabilities of its corresponding hardware resources 108 that are sufficient to fulfill the workload 308 in question.

For example, there may be four virtual instances 106 that can fulfill a workload 308. One virtual instance 106 may be currently utilized, and hence unavailable, and another virtual instance 106 may not have sufficient capacity to fulfill the workload 308. Therefore, neither of these two virtual instances 106 is selected. Of the remaining two virtual instances 106 in this example, one virtual instance 106 may be able to fulfill the workload 308 more quickly than the other virtual instance 106, but at higher operating cost. Therefore, either of these latter two virtual instances 106 may be selected, depending on whether cost or timeliness is more important in completing the workload 308.

Once a given virtual instance 106 has been selected for a workload 308, the workload is scheduled for completion on the virtual instance 106 in question (408). Various algorithmic and other approaches may be employed to perform scheduling. For example, the workload 308 may be passed to the given virtual instance 106, which completes its provided workloads 308 in a first-in, first-out (FIFO) manner. As another example, the workload 308 may be permitted to be scheduled for completion in advance of already scheduled workloads 308 on the virtual instance 106, depending on its priority, and the assured completion times of the already scheduled workloads 308 that will be pushed back, for instance.

Extensions to these scheduling techniques can also be implemented. As one example, the scheduler 302 may monitor completion of the workloads 308. If the workloads 308 are not being completed as expected, duplicate workloads 308 may be created and scheduled on other virtual instances 106, such as those having higher capacities, for instance. This approach is particularly useful where a job 304 is divided into multiple job components 306, such that completion of the job 304 is dependent on completion of its constituent job components 306. If completion of the job 304 is waiting on the completion of the workload 308 for just one job component 306, then a duplicate workload 308 for this job component 306 may be created and scheduled on a different virtual instance 106, to speed along completion of the job 304 as a whole, for instance.

Figure 5:
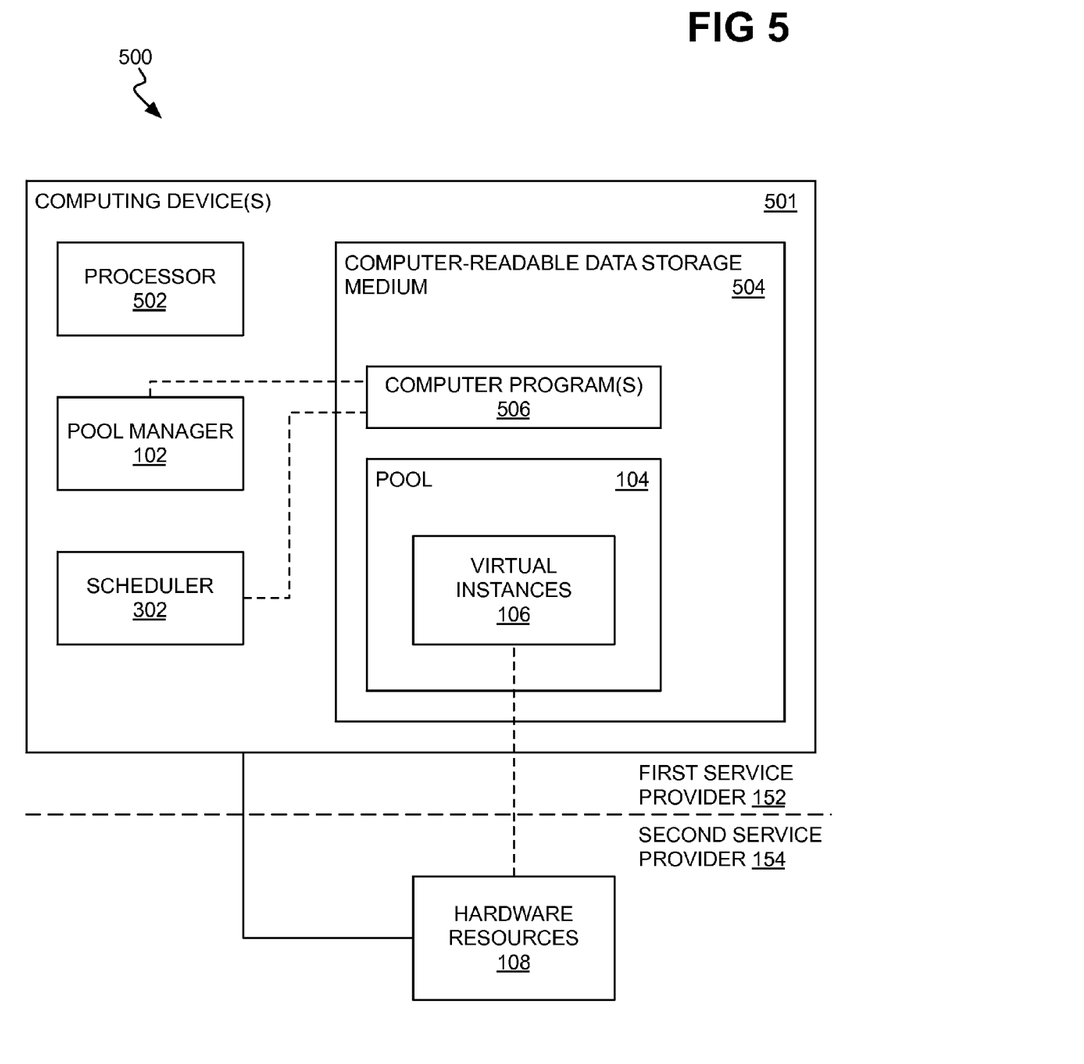
FIG. 5 is a diagram of an example system including a pool manager, a scheduler, and a dynamic pool of virtual instances corresponding to hardware resources.

FIG. 5 shows an example system 500. The example system 500 includes one or more computing devices 501 and the hardware resources 108. The first service provider 152 manages and is responsible for the computing devices 501, whereas the second service providers 154 manage and are responsible for the hardware resources 108. The hardware resources 108 can be directly connected to the computing devices 501, or connected over one or more networks to the computing devices 501.

The computing devices 501 include at least a processor 502 and a non-transitory computer-readable data storage medium 504. The computing devices 501 can and typically will include other hardware components, in addition to the processor 502 and the computer-readable data storage medium 504. The computer-readable data storage medium 504 stores one or more computer programs 506, and data representing the dynamic pool 104 of virtual instances 106 that has been described.

The computing devices 501 includes the pool manager and the scheduler 302 as follows. The computer programs 506 include computer-readable code that implements the pool manager 102 and the scheduler 302. The processor 502 executes the computer-readable code of the computer programs 506 to perform the functionality ascribed above to the pool manager 102 and the scheduler 302. As such, it can be said that the processor 502 and/or the computer-readable data storage medium 504 implement the pool manager 102 and the scheduler 302.

The solid line between the processor 502 and the computer-readable data storage medium 504 indicates that the former and latter are communicatively interconnected to one another. Similarly, the solid line between the computing devices 501 and the hardware resources 108 indicates that the former and latter are communicatively interconnected to one another. The dotted line between the pool manager 102 and the computer programs 506, and the dotted line between the scheduler 302 and the computer programs 506, indicate that the computer-readable code of the computer programs 506 implement the pool manager 102 and the scheduler 302. The dotted line between the virtual instances 106 and the hardware resources 108 indicates that the virtual instances 106 correspond to and represent the hardware resources 108.

As described above, the pool manager 102 manages the dynamic pool of virtual instances 106. Such management includes adding, removing, and augmenting the virtual instances 106, for instance. The scheduler 302 schedules workloads on the virtual instances 106, for completion by the hardware resources 108 to which the virtual instances 106 correspond.

We claim:

1. A system comprising:
   one or more computing devices communicatively coupled to a plurality of hardware resources, the computing devices maanaged by a first service provider, the hardware resources managed by one or more second service providers different than the first service provider;
   a pool manager to manage a dynamic pool of virtual instances, each virtual instance corresponding to one or more of the hardware resources, the pool manager to track for each virtual instance: historical and current utilization, an operating cost, a capacity, and a characteristic associated with a capability of the virtual instance; and
   a scheduler to select a given virtual instance of the dynamic pool of virtual instances on which to schedule a workload for completion, based on a characteristic of the workload matching the characteristic of the given virtual instance, and taking into account the capacity, the current utilization, and the operating cost of the given virtual instance,
   wherein the pool manager and the scheduler are implemented on the computing devices, and wherein the scheduler is to:
      receive a job from a customer, the customer being different than the first service provider and the one or more second service providers,
      divide the job into a plurality of job components,
      hierarchically organize the plurality of job components,
      determine a workload for each of the plurality of job components,
      assign the workloads to the virtual instances in the dynamic pool of virtual instances based on matching characteristics of the workloads with the characteristics of the virtual instances, and
      schedule the workloads for completion on the assigned virtual instances.

2. The system of claim 1, wherein the pool manager is to add a new virtual instance to the dynamic pool based on tracking of the historical and current utilization, the capacity, and the characteristic of each virtual instance already in the dynamic pool.

3. The system of claim 1, wherein the pool manager is to cause or request the capacity of an existing virtual instance of the dynamic pool to be augmented with additional of the hardware resources based on tracking of the historical and current utilization, the capacity, and the characteristic of at least the existing virtual instance in the dynamic pool.

4. The system of claim 1, wherein the pool manager is to tag an existing virtual instance of the dynamic pool for removal from the dynamic pool based on tracking of the historical and current utilization, the capacity, and the characteristic of each virtual instance already in the dynamic pool.

5. The system of claim 1, wherein the pool manager is to remove an existing virtual instance from the dynamic pool upon the existing virtual instance completing uncompleted workloads already scheduled on the existing virtual instance.

6. The system of claim 1, wherein, when a given workload is not completed by one of the virtual instances, the scheduler is to duplicate the given workload and assign the duplicate workload to another virtual instance in the dynamic pool of virtual instances.

7. The system of claim 1, wherein a first hierarchically organized job component is a parent job component to a second hierarchically organized job component, and the workload corresponding to the second hierarchically organized job component loosely inherits one or more characteristics from the workload corresponding to the first hierarchically organized job component.

8. The system of claim 1, wherein a first hierarchically organized job component is a parent job component to a second hierarchically organized job component, and the workload corresponding to the second hierarchically organized job component strictly inherits one or more characteristics from the workload corresponding to the first hierarchically organized job component.

9. The system of claim 1, wherein a first hierarchically organized job component is a parent job component to a second hierarchically organized job component, and the workload corresponding to the first hierarchically organized job component is scheduled on a first virtual instance of the dynamic pool that is different than a second virtual instance of the dynamic pool on which the workload corresponding to the second hierarchically organized job component is scheduled.

10. A non-transitory computer-readable data storage medium storing a computer program executable by a computing device to cause the computing device to:
   manage a dynamic pool of virtual instances, each virtual instance corresponding to one or more hardware resources of a plurality of hardware resources to which the computing device is communicatively coupled, wherein the computing device is to track characteristics of each virtual instance including: historical and current utilization, an operating cost, a capacity, and a characteristic associated with a capability of the virtual instance, and wherein the computing device is managed by a first service provider, and the hardware resources are managed by one or more second service providers different than the first service provider;

receive a job from a customer, the customer being different than the first service provider and the one or more second service providers;

divide the job into a plurality of job components;

hierarchically organize the plurality of job components;

determine a workload for each of the plurality of job components;

assign the workloads to the virtual instances in the dynamic pool based on matching characteristics of the workloads with the characteristics of the virtual instances; and schedule the workloads for completion on the assigned virtual instances.

11. The non-transitory computer-readable data storage medium of claim 10, wherein to manage the dynamic pool of virtual instances, the computer program is to cause the computing device to add a new virtual instance to the dynamic pool, based on tracking of the historical and current utilization, the capacity, and the characteristic of each virtual instance already in the dynamic pool.

12. The non-transitory computer-readable data storage medium of claim 10, wherein to manage the dynamic pool of virtual instances, the computer program is to cause the computing device to request the capacity of an existing virtual instance of the dynamic pool to be augmented with additional of the hardware resources based on tracking of the historical and current utilization, the capacity, and the characteristic of at least the existing virtual instance in the dynamic pool.

13. The non-transitory computer-readable data storage medium of claim 10, wherein to manage the dynamic pool of virtual instances, the computer program is to cause the computing device to remove an existing virtual instance from the dynamic pool, including tagging the existing virtual instance of the dynamic pool for removal from the dynamic pool based on tracking of the historical and current utilization, the capacity, and the characteristic of each virtual instance already in the dynamic pool.

14. The non-transitory computer-readable data storage medium of claim 10, wherein to manage the dynamic pool of virtual instances, the computer program is to cause the computing device to remove an existing virtual instance from the dynamic pool occurs upon the existing virtual instance completing uncompleted workloads already scheduled on the existing virtual instance.

15. A method comprising:

managing, by a computing device managed by a first service provider, a dynamic pool of virtual instances on which to schedule a workload for completion, each virtual instance corresponding to one or more hardware resources of a plurality of hardware resources to which the computing device is communicatively coupled, the hardware resources managed by one or more second service providers different than the first service provider, receiving a job from a customer, the customer being different than the first service provider and the one or more second service providers;

dividing the job into a plurality of job components;

hierarchically organizing the plurality of job components;

determining a workload for each of the plurality of job components;

assigning the workloads to the virtual instances in the dynamic pool based on matching characteristics of the workloads with the characteristics of the virtual instances, taking into account the capacity, the current utilization, and the operating cost of the virtual instances; and scheduling the workloads for completion on the assigned virtual instances.

16. The method of claim 15, further comprising:

when a given workload is not completed by one of the virtual instances, duplicating the given workload and assigning the duplicate workload to another virtual instance in the dynamic pool of virtual instances.

17. The method of claim 16, wherein a first hierarchically organized job component is a parent job component to a second hierarchically organized job component, and the workload corresponding to the second hierarchically organized job component strictly inherits one or more characteristics from the workload corresponding to the first hierarchically organized job component.

18. The method of claim 16, wherein a first hierarchically organized job component is a parent job component to a second hierarchically organized job component, and the workload corresponding to the first hierarchically organized job component is scheduled on a first virtual instance of the dynamic pool that is different than a second virtual instance of the dynamic pool on which the workload corresponding to the second hierarchically organized job component is scheduled.

19. The method of claim 15, wherein a first hierarchically organized job component is a parent job component to a second hierarchically organized job component, and the workload corresponding to the second hierarchically organized job component loosely inherits one or more characteristics from the workload corresponding to the first hierarchically organized job component.

20. The method of claim 15, further comprising:

removing, by the computing device managed by the first service provider, an existing virtual instance from the dynamic pool occurs upon the existing virtual instance completing uncompleted workloads already scheduled on the existing virtual instance.

* * * * *

UNITED STATES PATENT AND TRADEMARK OFFICE
CERTIFICATE OF CORRECTION

PATENT NO.        : 9,213,503 B2
APPLICATION NO.   : 13/284944
DATED             : December 15, 2015
INVENTOR(S)       : Kamath Harish B et al.

It is certified that error appears in the above-identified patent and that said Letters Patent is hereby corrected as shown below:

IN THE CLAIMS

In column 9, line 45, in Claim 1, delete "maanaged" and insert -- managed --, therefor.

Signed and Sealed this
Twelfth Day of April, 2016

Michelle K. Lee
*Director of the United States Patent and Trademark Office*